Dec. 6, 1960  R. H. HINKLE  2,963,181
BIN LEVELLER
Filed March 19, 1959  3 Sheets-Sheet 1
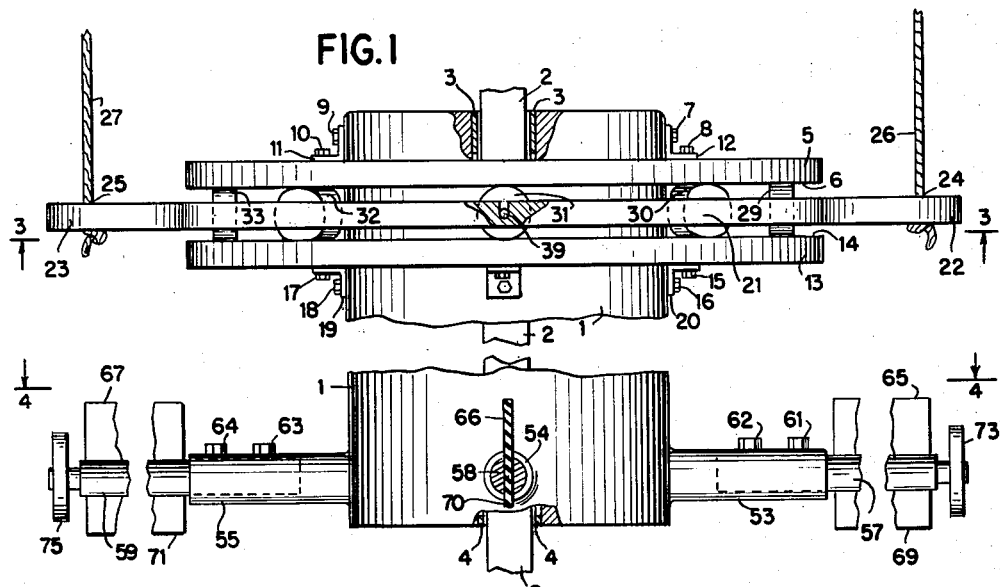
FIG. 1
FIG. 2
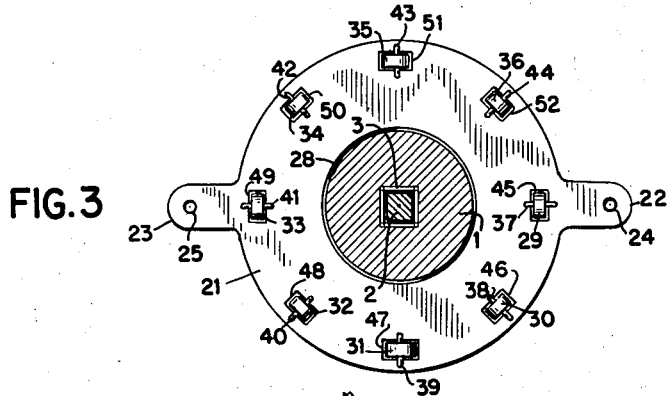
FIG. 3
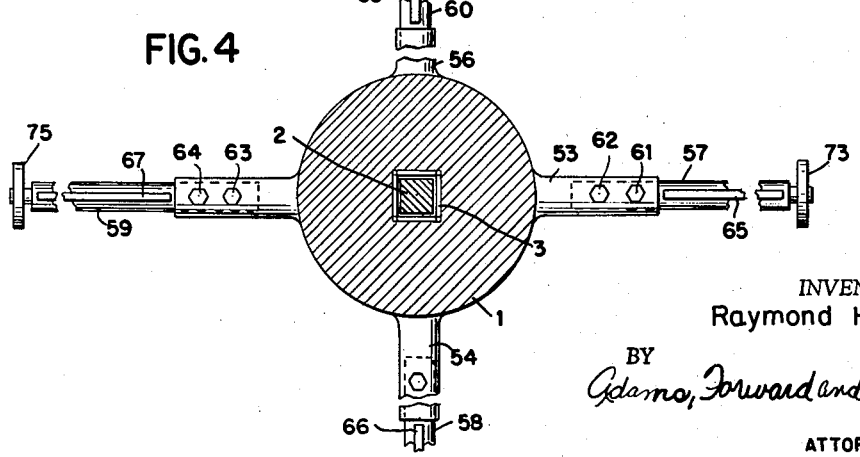
FIG. 4
INVENTOR.
Raymond Hinkle
BY
Adamo, Forward and McLean
ATTORNEYS Dec. 6, 1960   R. H. HINKLE   2,963,181
BIN LEVELLER Filed March 19, 1959   3 Sheets-Sheet 3

INVENTOR.
Raymond Hinkle
BY Adams, Forward & McLean
ATTORNEYS

# United States Patent Office 2,963,181
Patented Dec. 6, 1960

2,963,181
BIN LEVELLER
Raymond H. Hinkle, 256—42 Upland Road, Great Neck, N.Y.

Filed Mar. 19, 1959, Ser. No. 800,601

8 Claims. (Cl. 214—17)

My invention relates to the delivery from storage of granular and powdered materials such as farinaceous products and, more particularly, provides an easily installed leveller for the efficient emptying of bulk flour storage bins.

The flour used by bakeries is commonly stored by them in erect cylindrical storage bins. These bins are usually filled pnuematically from above and are emptied from below by, for example, one or more helicoid screws which traverse some portion of the bin floors. These helicoid screws can be of variable pitch or constructed of sections of various lengths, each length having a different pitch.

The flow of the flour through a bakery storage bin is largely the product of the gravitational force acting simultaneously with the forces removing flour at the base of the bin. However, as these forces are exerted, the flour usually does not settle evenly throughout the length and breadth of the bin and this is reflected by holing, bridging and channeling in the uppermost surface of the flour. This holing, bridging and channeling, in turn, adversely effects the even flow of the flour out of the bin.

It has been proposed that, in order to improve the ready delivery of flour from the base of a bulk flour storage bin, the bin be given the form of an inverted cone, the sloping sides of which tend to assist in the even settling of the stored flour as its upper surface moves down the cone. However, bins having conical sides require a greater height, in order to store a comparable quantity of flour, than do bins having the vertical sides of a cylinder and such a greater height is not always available, especially in existing plants, without costly plant construction changes.

Thus, it has been sought to improve the flow through, i.e., from top to bottom, cylindrical bulk flour storage bins and to improve the rate of delivery of the flour from the bins. It is also an object of my invention to keep the upper surface of the stored flour as level and even as possible and to combat the tendency of gullies, holes and pits to form in such a surface due to the action of helicoid screws and the like operating at or near the base of such bin to remove flour therefrom. It is a further object of my invention to provide a device requiring the least possible mechanical or structural change in existing facilities.

These and other objects are accomplished by providing the erect cylindrical storage bin with an axially disposed rotatable shaft and locking, i.e., mating, therewith for rotational purposes a rotatable, sweep-armed levelling device having a vertically elongated hub, i.e., housing, which is hollowed along its internal, vertical length for the axially sliding reception of the shaft. The storage bin is also provided with mechanical means for raising and lowering the levelling device about and along the shaft and the levelling device is provided, at its upper external end, with means which connect the raising and lowering mechanism to the levelling device and, at the same time, permit the free rotation of the device with respect to the lifting means.

More particularly, and in one embodiment of my invention, the housing has an upper portion and a lower portion. Three substantially flat and center-holed plates are fitted about the exterior of the upper portion of the housing in planes substantially perpendicular to the housing's length. The three plates include an upper and a lower swivel plate, each having substantially flat upper and lower surfaces, which are permanently or detachably secured to the exterior of the housing and which are positioned a sufficient distance apart along the length of the housing to permit the positioning and, thereafter, the movement of the third, lift plate, i.e., the plate by which my entire leveller can be lifted along the upright shaft of the cylindrical bulk flour storage bin, between the lower surface of the upper swivel plate and the upper surface of the lower swivel plate. Ball or roller bearings or the like are employed to ease this movement. This movement is further made possible by the fact that the center holes of the swivel plates are so sized as to provide a snug fit between the plates and the exterior of the housing and to prevent substantially any rotation of the housing relative to such plates. By contrast, the center hole of the lift plate is loosely fitted, i.e., sized sufficiently large enough to permit the substantially free rotation of the housing which is positioned therein.

As regards the lower portion of the housing of my invention, it serves as a mounting for one or more arms, i.e., blades, which are detachably secured and positioned in a plane substantially perpendicular to the length of the housing. Thus, when the housing is placed upon the bin shaft, the arms project in substantially radial directions within the cylindrical bin.

For a more complete understanding of a practical application of the features and principles of my invention, reference is made to the appended drawings in which:

Figure 1 is a front elevation of the upper portion of the levelling device constructed in accordance with my invention;

Figure 2 is a front elevation of the lower portion of the levelling device constructed in accordance with my invention;

Figure 3 is a plan section taken substantially on line 3—3 of Figure 1;

Figure 4 is a plan section taken substantially on line 4—4 of Figure 2;

Figure 5:
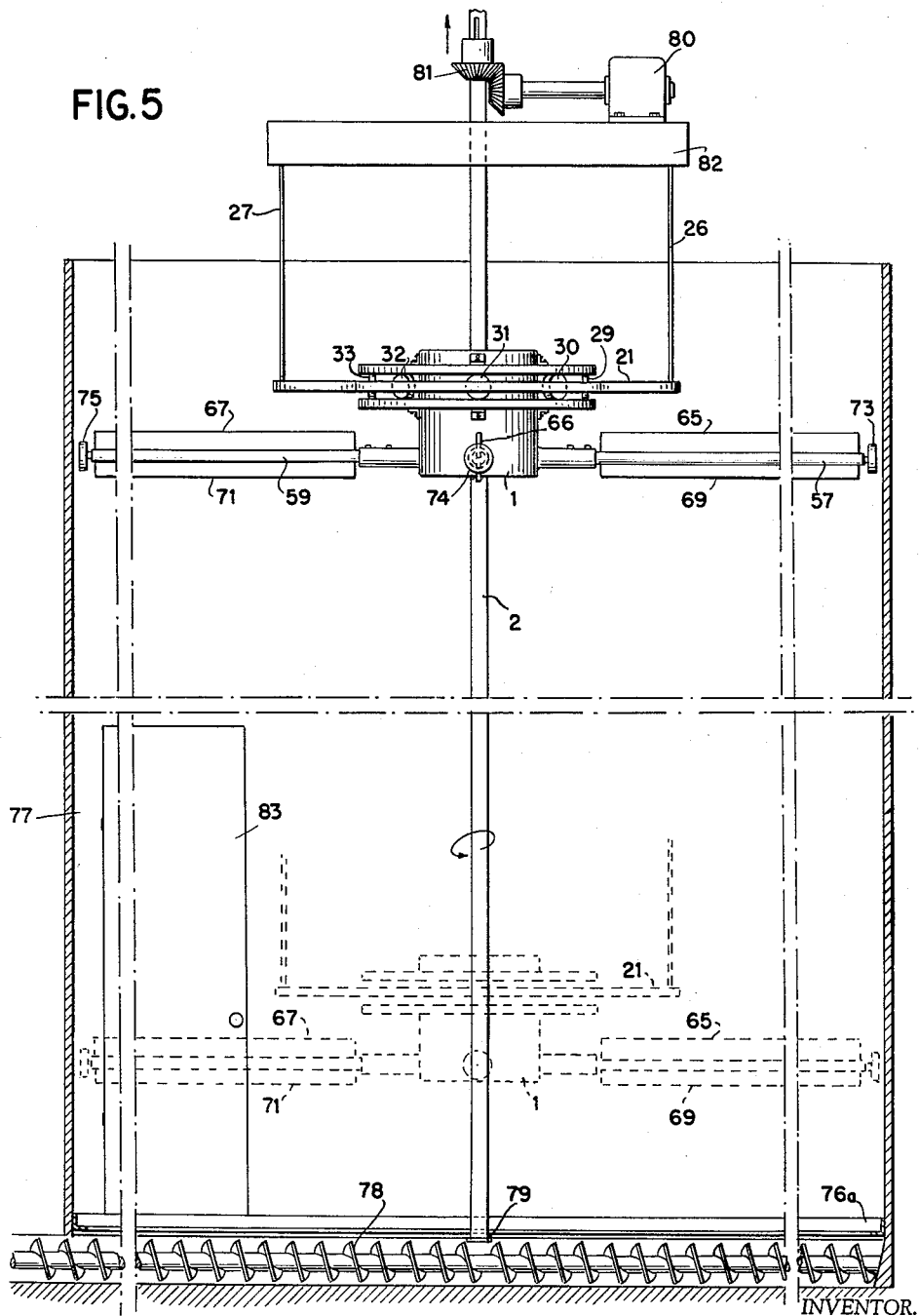
Figure 5 is a vertical section of a cylindrical bulk flour storage bin employing the levelling device constructed in accordance with my invention; and, Figure 6 is a vertical section of an upper portion of the cylindrical storage bin of Figure 5 in which another embodiment of the levelling device constructed in accordance with my invention is shown.

As embodied in Figures 1, 2 and 5, the housing of my invention is a one-piece, cast shell 1 having already included in its lower portion the means, i.e., spokes 53, 54, 55 and 56, for receiving and mounting arms 57, 58, 59 and 60, respectively. In another embodiment, the housing is constructed of pieces of angle-iron and is, therefore, open on its sides. In still another embodiment, housing shell 1 is split longitudinally and equipped with means to clamp its two halves together, thereby affording a housing which is readily assembled and dis-assembled.

As shown in Figures 1, 2, 3, and 4, the housing shell 1 is hollowed out to receive a rotatable square shaft 2 along its interior length in a sliding fit. The shell 1 is further provided with shims 3, 4 to lessen wear on the shell 1 and on shaft 2 caused by such sliding. In another embodiment, the housing is hollowed out to receive a hexagonal shaft and, in still another, the housing and shaft are keyed so as to insure turning of the housing when the shaft is rotated.

To the exterior of the upper portion of housing shell 1, as shown in Figure 1, a center-holed upper swivel plate 5 having a flat lower surface 6 is secured by means of bolts 7, 8, 9 and 10 and angle-iron pieces 11 and 12. The size of the center hole and the securing means, which, in another preferred embodiment, are welds, prevent either vertical or lateral movement by plate 5 relative to the housing shell 1. Similarly, a center-holed lower swivel plate 13 having a flat upper surface 14 is secured by means of bolts 15, 16, 17 and 18 and angle-iron pieces 19 and 20. Again, the size of the center hole and the securing means prevent either vertical or lateral movement by plate 13 relative to the housing shell 1.

Figures 1 and 3 show lift plate 21, having projecting arms 22 and 23, which are bored with holes 24 and 25, respectively, to receive lifting cables 26 and 27, respectively, positioned about housing shell 1 and between upper swivel plate 5 and lower swivel plate 13. The lift plate is not secured to the exterior of housing shell 1 and, in fact, its center hole 28 is so sized as to permit its free rotation about the housing shell or, otherwise expressed, the free rotation of the housing shell within the center hole 28 of lift plate 21. Such rotation is further facilitated by mounting bearings 29, 30, 31, 32, 33, 34, 35 and 36 on pins, i.e., axles, 37, 38, 39, 40, 41, 42, 43 and 44, respectively, in lift plate slots 45, 46, 47, 48, 49, 50, 51 and 52, respectively. By the same token, these bearings substantially eliminate any vertical movement of lift plate 21 relative to the housing shell 1.

Figures 2 and 4 show the lower portion of the housing shell 1 of my invention and the spokes 53, 54, 55 and 56 made integral therewith in this particular embodiment. They also show the shim 4 which is employed to lessen wear between housing shell 1 and square shaft 2. Further, they show four arms 57, 58, 59 and 60 mounted in spokes 53, 54, 55 and 56, respectively, to project radially and secured therein by, for example, bolts 61, 62, 63 and 64. In this instance, the arms are pieces of seamless tubing. In another embodiment, lengths of angle-iron are employed. And, in still another embodiment, the arms can be mounted so as to be offset with respect to the longitudinal axis of housing shell 1.

Figures 2 and 5 show, in addition, the fitting of upper vanes 65, 66, 67 and 68 and lower vanes 69, 70, 71 and 72 on arms 57, 58, 59 and 60, respectively. The upper vanes are, preferably, of a greater height than the lower vanes. The figures also show the use of wheels 73, 74, 75 and 76 mounted at the ends of arms 57, 58, 59 and 60, respectively, and track 76a, which circles the base of the bin and upon which the wheels run. Such track, of course, bridges the channel into which helicoid screw 78 is set. The figures do not, however, show the use of runners made of neoprene or the like along the lower edges of the lower vanes to protect the latter from wearing on the base of the bin and to aid in sweeping the bin floor clean.

Figure 5 shows, further, the leveller of my invention mounted on square shaft 2 in cylindrical storage bin 77 having helicoid screw 78 traversing the diameter of its floor. The shaft is, in turn, mounted on bearing 79 and is driven by the motor 80. A movable bevel gear 81 provides a means by which the motor and the shaft can be disengaged at will. Finally, cables 26 and 27 can be paid in or out by means of the winding mechanism 82. The door 83 is shown only to give some indication of the dimensions involved.

Figure 6:
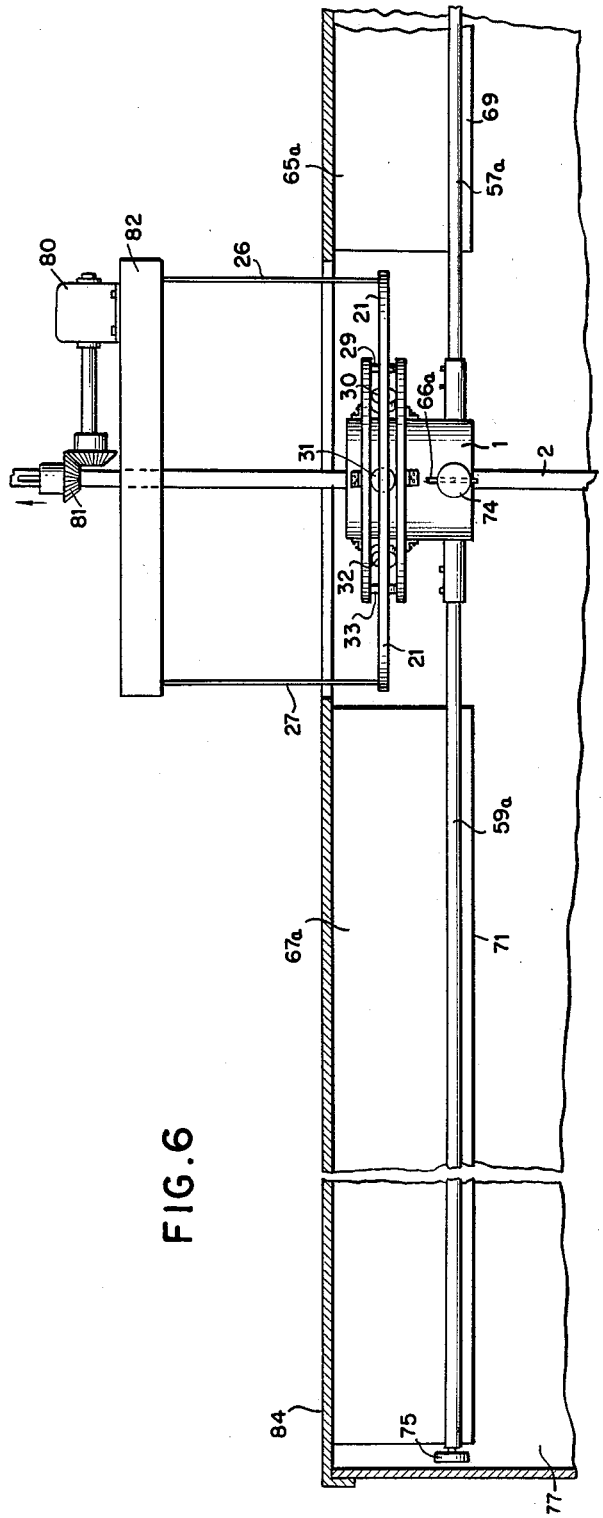

Figure 6 shows bin 77 with a cover which, in this instance, is annular in shape to accommodate the levelling device of my invention. It also shows vertically disposed upper vanes 65a and 67a secured along their lengths to arms 57a and 59a, respectively, to have an enlarged surface area or, otherwise expressed, to have a height greater than that of vanes 65 and 67 and, in fact, sufficient to reach the ceiling of bin 77, i.e., the lower surface of cover 84 when the levelling device has been lifted to the top of the bin. A runner of neoprene or the like (not shown) would normally be fitted to the upper edge of vane 67a to protect the latter from wearing against the ceiling of the bin on rotation of the leveller.

In operation, the housing shell 1 is lowered over the upper end of shaft 2 on cables 26 and 27 by means of winding mechanism 82 until it rests on the uppermost level of the flour in bin 77. Winding mechanism 82 is then disengaged. Thereafter, as helicoid screw 78 draws off flour at the base of bin 77, bevel gear 81 is engaged and shaft 2 is rotated by power supplied by motor 80. The turning of shaft 2 within housing shell 1 causes the shell to turn and, with it, upper swivel plate 5 and lower swivel plate 13. However, lift plate 21, being free of housing shell 1 does not rotate due to its own inertia and, therefore, lifting cables 26 and 27 are not fouled by such rotation.

As helicoid screw 78 empties bin 77, the uppermost surface of the stored flour drops in an uneven fashion. However, the rotation of housing shell 1 and, therefore, of arms 57, 58, 59 and 60 on square shaft 2 during this emptying causes upper vanes 65, 66, 67 and 68 and lower vanes 69, 70, 71 and 72 to sweep the uppermost surface and to keep it level, thereby facilitating the ready delivery of the flour at the base of the bin.

When the bin has been substantially emptied, my device for levelling flour is at the bottom of the bin and wheels 73, 74, 75 and 76 mounted on arms 57, 58, 59, and 60, respectively, then come into play with track 76a to prevent undue wear on the lower vanes mounted on the arms, while, at the same time, allowing such vanes to sweep the bin floor substantially clean.

Finally, when the bin is empty, the rotation of shaft 2 is stopped by the disengagement of bevel gear 81. The leveller is then raised by means of winding mechanism 82 and lifting cables 26 and 27 and the bin is ready to be washed and/or refilled from the top, unless, of course, it is necessary first to sweep clean the bin ceiling shown in Figure 6. In such a case, one or more of arms 57, 58, 59 and 60 are replaced by high-vaned arms like 59a, so that the leveller can assist in this task as well.

This is a continuation-in-part of my earlier application, Serial No. 700,880, filed December 5, 1957, now abandoned.

I claim:

1. A rotatable leveller comprising a vertically elongated housing hollowed along its interior length to receive a rotatable shaft in an axially sliding fit and rotatable therewith, means for lifting the housing secured to the upper end thereof and freely rotatable with respect to the housing, and at least one radially projecting arm secured to the lower end of the housing in a plane substantially perpendicular to the housing.

2. In combination, an erect cylindrical bulk granular material storage bin having at least one helicoid screw for removing the material from the bin traversing a portion of the floor thereof, bearing means at the center of the floor for receiving a rotatable shaft, a rotatable shaft disposed in the bearing means and positioned along the axis of the bin, drive means for rotating the rotatable shaft, and a rotatable leveller comprising a vertically elongated housing hollowed along its interior length to receive the rotatable shaft in an axially sliding fit and rotatable therewith, means for lifting the housing secured to the upper end thereof and freely rotatable with respect to the housing, and at least one radially projecting arm secured to the lower end of the housing in a plane substantially perpendicular to the housing.

3. A rotatable leveller comprising a vertically elongated housing hollowed along its interior length to receive a rotatable square shaft in an axially sliding fit and having an upper portion and a lower portion, a center-holed upper swivel plate having a substantially flat lower surface detachably secured about the exterior of the upper portion of the housing in a plane substantially perpendicular to the length of the housing, means for detachably securing the upper swivel plate to the exterior of the upper portion of the housing, a center-holed lift plate loosely fitted about the exterior of the upper portion of the housing in a plane substantially perpendicular to the length of said housing, said lift plate being positioned below the upper swivel plate along the length of the housing, bearing means between the lift plate and the lower surface of the upper swivel plate, a center-holed lower swivel plate having a substantially flat upper surface detachably secured about the exterior of the upper portion of the housing in a plane substantially perpendicular to the length of the housing, said lower swivel plate being positioned below the lift plate along the length of the housing, means for detachably securing the lower swivel plate to the exterior of the upper portion of the housing, bearing means between the lift plate and the upper surface of the lower swivel plate, at least one radially projecting arm detachably secured to the exterior of the lower portion of the housing in a plane substantialy perpendicular to the length of the housing, and means for detachably securing the arms to the lower portion of the housing.

4. In combination, an erect cylindrical bulk granular material storage bin having a floor and a ceiling having at least one helicoid screw for removing the material from the bin traversing a portion of the floor thereof, bearing means at the center of the floor for receiving a rotatable square shaft, a rotatable square shaft disposed in the bearing means and positioned along the axis of the bin, drive means for rotating the rotatable square shaft, and a rotatable leveller comprising a vertically elongated housing hollowed along its interior length to receive the rotatable square shaft in an axially sliding fit and having an upper portion and a lower portion, a center-holed upper swivel plate having a substantially flat lower surface detachably secured about the exterior of the upper portion of the housing in a plane substantially perpendicular to the length of the housing, means for detachably securing the upper swivel plate to the exterior of the upper portion of the housing, a center-holed lift plate loosely fitted about the exterior of the upper portion of the housing in a plane substantially perpendicular to the length of said housing, said lift plate being positioned below the upper swivel plate along the length of the housing, bearing means between the lift plate and the lower surface of the upper swivel plate, means for lifting said lift plate, a center-holed lower swivel plate having a substantially flat upper surface detachably secured about the exterior of the upper portion of the housing in a plane substantially perpendicular to the length of the housing, said lower swivel plate being positioned below the lift plate along the length of the housing, means for detachably securing the lower swivel plate to the exterior of the upper portion of the housing, bearing means between the lift plate and the upper surface of the lower swivel plate, at least one radially projecting arm detachably secured to the exterior of the lower portion of the housing in a plane substantially perpendicular to the length of the housing, and means for detachably securing the arms to the lower portion of the housing.

5. A rotatable leveller comprising a vertically elongated housing hollowed along its interior length to receive a rotatable shaft in an axially sliding fit and rotatable therewith, means for lifting the housing secured to the upper end thereof and freely rotatable with respect to the housing, at least one radially projecting arm secured to the lower end of the housing in a plane substantially perpendicular to the housing, and at least one vertically disposed vane secured along its length to such arm.

6. In combination, an erect cylindrical bulk granular material storage bin having a floor and a ceiling and having at least one helicoid screw for removing the material from the bin traversing a portion of the floor, bearing means at the center of the floor for receiving a rotatable shaft, a rotatable shaft disposed in the bearing means and positioned along the axis of the bin, drive means for rotating the rotatable shaft, and a rotatable leveller comprising a vertically elongated housing hollowed along its interior length to receive the rotatable shaft in an axially sliding fit and rotatable therewith, means for lifting the housing secured to the upper end thereof and freely rotatable with respect to the housing, at least one radially projecting arm secured to the lower end of the housing in a plane substantially perpendicular to the housing, and at least one vertically disposed vane secured along its length to such arm.

7. A rotatable leveller comprising a vertically elongated housing hollowed along its interior length to receive a rotatable square shaft in an axially sliding fit and having an upper portion and a lower portion, a center-holed upper swivel plate having a substantially flat lower surface detachably secured about the exterior of the upper portion of the housing in a plane substantially perpendicular to the length of the housing, means for detachably securing the upper swivel plate to the exterior of the upper portion of the housing, a center-holed lift plate loosely fitted about the exterior of the upper portion of the housing in a plane substantially perpendicular to the length of said housing, said lift plate being positioned below the upper swivel plate along the length of the housing, bearing means between the lift plate and the lower surface of the upper swivel plate, a center-holed lower swivel plate having a substantially flat upper surface detachably secured about the exterior of the upper portion of the housing in a plane substantially perpendicular to the length of the housing, said lower swivel plate being positioned below the lift plate along the length of the housing, means for detachably securing the lower swivel plate to the exterior of the upper portion of the housing, bearing means between the lift plate and the upper surface of the lower swivel plate, at least one radially projecting arm detachably secured to the exterior of the lower portion of the housing in a plane substantially perpendicular to the length of the housing, means for detachably securing the arms to the lower portion of the housing, and at least one vertically disposed vane secured along its length to such arm.

8. In combination, an erect cylindrical bulk granular material storage bin having a floor and a ceiling having at least one helicoid screw for removing the material from the bin traversing a portion of the floor thereof, bearing means at the center of the floor for receiving a rotatable square shaft, a rotatable square shaft disposed in the bearing means and positioned along the axis of the bin, drive means for rotating the rotatable square shaft, and a rotatable leveller comprising a vertically elongated housing hollowed along its interior length to receive the rotatable square shaft in an axially sliding fit and having an upper portion and lower portion, a center-holed upper swivel plate having a substantially flat lower surface detachably secured about the exterior of the upper portion of the housing in a plane substantially perpendicular to the length of the housing, means for detachably securing the upper swivel plate to the exterior of the upper portion of the housing, a center-holed lift plate loosely fitted about the exterior of the upper portion of the housing in a plane substantially perpendicular to the length of said housing, said lift plate being positioned below the upper swivel plate along the length of the housing, bearing means between the lift plate and the lower surfaces of the upper swivel plate, means for lifting said lift plate, a center-holed lower swivel plate having a substantially flat upper surface detachably secured about the exterior of the upper portion of the housing in a plane substantially perpendicular to the length of the housing, said lower swivel plate being positioned below the lift plate along the length of the housing, means for detachably securing the lower swivel plate to the exterior of the upper portion of the housing, bearing means between the lift plate and the upper surface of the lower swivel plate at least one radially projecting arm detachably secured to the exterior of the lower portion of the housing in a plane substantially perpendicular to the length of the housing, means for detachably securing the arms to the lower portion of the housing, and at least one vertically disposed vane secured along its length to such arm, said vane having a height sufficient to reach the ceiling when the leveller is lifted to the top of the storage bin.

References Cited in the file of this patent

UNITED STATES PATENTS

| | | |
|---|---|---|
| 750,241 | Buck | Jan. 19, 1904 |
| 1,570,185 | Saxe | Jan. 19, 1926 |
| 1,740,250 | Kutz | Dec. 17, 1929 |